United States Patent Office 2,706,717
Patented Apr. 19, 1955

2,706,717

VINYL ETHER CONTAINING HYDRAULIC FLUIDS

Lothar Jakob, Viernheim, Germany, assignor to Badische Anilin- & Soda-Fabrik Aktiengesellschaft, Ludwigshafen (Rhine), Germany No Drawing. Application July 31, 1951, Serial No. 239,631

Claims priority, application Germany August 9, 1950

5 Claims. (Cl. 252—73)

This invention relates to a method for the production of certain vinyl ethers and hydraulic fluids containing such ethers.

It is well known to use mixtures of vegetable oils, advantageously castor oil, with alcohols or ethers, in particular the monoalkyl ethers of ethylene glycol and polyethylene glycol, as liquids for hydraulic apparatus, as for example liquid barkes in motor cars, lifting jacks, regulating plant and the like. Such mixtures usually contain, as stabilizing agents and corrosion-preventing agents, some alkali hydroxide or more weakly-acting alkaline substances, as for example triethanolamine or potassium phenylglycine. It has also already been proposed to use polyglycols instead of vegetable oils in such hydraulic liquids. Mixtures of polyglycols with alcohols or glycol monoalky ethers, if desired with an addition of water, are very suitable for this purpose and in many respects are even superior to oil-containing liquids by reason of their unsaponifiability, but their water content or their water compatibility may lead to attack on the metal at the more sensitive parts of the hydraulic apparatus.

I have now found that mixtures of polyvinyl ethers of lower aliphatic saturated alcohols with alcohols or ethers, in particular the lower monoalkyl ethers of ethylene and diethylene glycol, are eminently suitable as hydraulic liquids. Contrasted with oil-containing mixtures of analogous composition, they are distinguished by unsaponifiability and only slight swelling of the rubber packings present in the hydraulic apparatus and, contrasted with liquids containing polyglycol, they are distinguished by their small hygroscopicity.

Polyvinyl methyl ethters of relatively low molecular weight having a K-value of about 7 to 10, such as are obtainable by polymerizing vinyl methyl ether at high temperatures, as for example between about 150° and and 200° C., are especially suitable as hydraulic liquids according to this invention. If especially high requirements are to be satisfied by the hydraulic liquids, the polyvinyl methyl ether may be subjected to a catalytic hydrogenation under increased pressure. The hydrogenation is advantageously carried out under energetic conditions for such a period of time that hydrogen is no longer absorbed, preferably at 150° to 300° C. in the presence of active nickel at a pressure of at least 100 atmospheres.

By subjecting polyvinyl ethers of low molecular alcohols to a catalytic hydrogenation at elevated temperature and under superatmospheric pressure, the physical and chemical data of the products are at least partly changed. Generally speaking, the viscosity is decreased to some extent, especially the viscosity at low temperatures, whereas the viscosity at high temperatures remains substantially the same. Thus, the viscosity index of the products is increased by hydrogenation. On the other hand, the intrinsic viscosity may increase in some cases, especially when hydrogenating at relatively low temperatures, say from 140° to 160° C., however, even then the viscosity index will be found higher than it was before. The polymerization degree of the polyvinyl ethers remains practically the same; the OH-number which is usually very low, is likewise hardly affected by hydrogenation.

The products obtained by hydrogenation of polyvinyl lower alkyl ethers are preferably subjected to a distillation process wherein by-products formed during hydrogenation, such as water, methanol etc., are expelled. The distillation residue may then be used as an ingredient in hydraulic liquids without further treatment.

The alcohols or ethers used as diluents in preparing hydraulic liquids from hydrogenated polyvinyl ethers may be selected according to the purpose for which the liquids are to be used. If only slight variations in temperature are to act on the hydraulic liquid, ethanol and its next higher homologues, diacetone alcohol and other mobile saturated alcohols up to 6 carbon atoms may be added. In the case of marked variations in temperature, the monoethers of glycols up to 4 carbon atoms with lower saturated aliphatic alcohols, say up to 4 carbon atoms, as for example ethylene glycol monobutyl ether or diethylene glycol monoethyl ether, yield especially useful mixtures with the polyvinyl ethers. Mixtures of simple alcohols with one another or with glycol ethers, or mixtures of glycol ethers with one another, may also be added.

The relative proportions of the polyvinyl methyl ethers and the other constituents may be varied according to the purpose for which the liquids are to be used. Generally speaking the proportions of the polyvinyl ether is between one third and one sixth of the whole amount. The conventional corrosion-preventing agents, referred to above, may also be added.

The following examples will further illustrate this invention but the invention is not restricted to these examples. The parts are by weight.

*Example 1*

This example shows the influence of the hydrogenation on a polyvinyl methyl ether prepared by polymerization at 150° C. in the presence of a Friedel-Crafts catalyst, e. g. BF₃. The data of this ether are:

Viscosity _____ 1374 centistokes at 20° C.;
18.2 centistokes at 99° C.
Viscosity index _____ 63.
OH-number _____ 3.
K-value of a 15 per cent solution in benzene _____ 8.5.

4800 parts of this ether are admixed with 70 parts of Raney nickel, placed in an autoclave, heated to 250° C. and treated with hydrogen under 250 atmospheres until it was no longer absorbed. 1000 parts of the polyvinyl ether consume 12 parts of hydrogen. When releasing the pressure a gas is set free which contains 60 per cent of methane and 40 per cent of hydrogen. The reaction liquid is heated to distil off 185 parts of aqeous methanol. After removing the catalyst, 4000 parts of an oil are obtained having the following data:

Viscosity _____ 813 centistokes at 20° C.;
16.8 centistokes at 99° C.
Viscosity index _____ 89.
OH-number _____ 6.
K-value of a 15 per cent solution in benzene_____ 9.

Apparently OH-number and K-value have not changed substantially, whereas the influence of the hydrogenation on the viscosity is marked.

The hydrogenated product can be heated to from 70° to 140° C. for a month without much change in the above given data, whereas in heating the crude vinyl ether for such a time its viscosity at 20° C. is increased to 7140 centistokes and to 38.5 at 99° C.

*Example 2*

This example will demonstrate the influence of a hydrogenation at lower temperatures than in the preceding example.

4500 parts of the polyvinyl methyl ether having the characteristics of that used in Example 1 are admixed with 70 parts of Raney nickel and hydrogenated at 150° C. under 250 atmospheres until hydrogen is no longer consumed. Release of the vessel results in hydrogen free from ethane. By heating the product 180 parts of aqueous methanol are obtained. The remaining oil has the following data:

Viscosity _____ 2217 centistokes at 20° C.;
24.2 centistokes at 99° C.
Viscosity index _____ 70.
OH-number and K-value substantially unchanged.

When heating the oil to 70° C. for 2100 hours, the viscosity is still 2217 centistokes at 20° C. and 24 centistokes at 99° C.

*Example 3*

A polyvinyl methyl ether prepared by polymerization at 200° C. in the presence of $BF_3$ has the following data:

Viscosity _____ 291 centistokes at 20° C.;
8.9 centistokes at 99° C.
Viscosity index _____ 63.

By heating to 70° C. for 890 hours, the viscosity increases to 2131 centistokes and 22.5, respectively, and the viscosity indices decrease to 56.

The polyvinyl ether is hydrogenated in the manner described in Example 2. The product obtained, after removal of water and methanol, has the following data:

Viscosity _____ 188 centistokes at 20° C.;
9 centistokes at 99° C.
Viscosity index _____ 107.

After heating for 890 hours, the viscosity is still 225 centistokes and 9.8, respectively, and the viscosity index 103.

*Example 4*

A mixture is prepared from 82 parts of diethylene glycol monoethyl ether and 18 parts of a polyvinyl methyl ether which has been polymerized at 150° C., and 2 parts of potassium phenyl glycine are added. The mixture has good lubricating action, a setting point of −72° C., causes only slight corrosion and causes only negligible swelling of rubber even under extreme conditions.

*Example 5*

A mixture is prepared from 20 per cent of diethylene glycol monomethyl ether, 20 per cent of diethylene glycol monoethyl ether, 20 per cent of diethylene glycol propyl ether, 20 per cent of diethylene glycol butyl ether and 20 per cent of polyvinyl methyl ether which has been prepared at 150° C. and which has been hydrogenated as described in Example 1 and freed from volatile by-products. The more readily volatile constituents are removed from the hydrogenation product by heating in vacuo.

A polyvinyl methyl ether may also be used which has been hydrogenated as described in Example 2. Similarly a polyvinyl methyl ether which has been obtained by polymerisation by means of a Friedel-Crafts catalyst at 200° C. and subsequent hydrogenation as described in Example 3 may also be employed.

The mixtures contain as corrosion-preventing agents 0.6 per cent of triethanolamine and 1.5 per cent of sodium phenyl glycine.

The mixtures have good lubricating action, a setting point of about −80° C., and a viscosity of 1104 centistokes at −40° C. and 2.1 centistokes at 99° C. Corrosion of various metals and swelling of rubber in the liquid are extremely slight even at 70° C.

I claim:

1. A hydraulic fluid comprising a mixture of between five-sixths and two-thirds by weight of an aliphatic alcohol, selected from the group consisting of fully saturated aliphatic alcohols containing at most 6 carbon atoms and of monoethers of such alcohols containing up to 4 carbon atoms and glycols containing up to 4 carbon atoms, with between one-sixth and one-third by weight of a polymerized vinyl methyl ether of low viscosity, the 15 per cent solution of which in benzene has a K-value of between about 7 and 10.

2. A hydraulic fluid in accordance with claim 1, wherein the aliphatic alcohol is a monoether of a fully saturated aliphatic alcohol containing up to 4 carbon atoms and a glycol containing up to 4 carbon atoms.

3. A hydraulic fluid comprising a mixture of between five-sixths and two-thirds by weight of an aliphatic alcohol, selected from the group consisting of fully saturated aliphatic alcohols containing at most 6 carbon atoms and of monoethers of such alcohols containing up to 4 carbon atoms and glycols containing up to 4 carbon atoms, with between one-sixth and one-third by weight of a polymerized vinyl methyl ether of low viscosity, the 15 per cent solution of which in benzene has a K-value of between about 7 and 10, and which has been subjected to a catalytic hydrogenation in the presence of an active nickel catalyst at temperatures from 150° to 300° C. under a pressure of at least 100 atmospheres until hydrogen is no longer absorbed, and freed from lower boiling ingredients.

4. A hydraulic fluid in accordance with claim 3, wherein the aliphatic alcohol is a monoether of a fully saturated aliphatic alcohol containing up to 4 carbon atoms and a glycol containing up to 4 carbon atoms.

5. A hydraulic fluid in accordance with claim 1, wherein the aliphatic alcohol is a monoether of a fully saturated aliphatic alcohol containing up 4 carbon atoms and diethylene glycol.

References Cited in the file of this patent

UNITED STATES PATENTS

| | | |
|---|---|---|
| 2,330,773 | Zimmer | Sept. 28, 1943 |
| 2,499,551 | White | Mar. 7, 1950 |